(No Model.)
J. DEMAREST.
Water Closet Basin.
No. 235,134.  Patented Dec. 7, 1880.
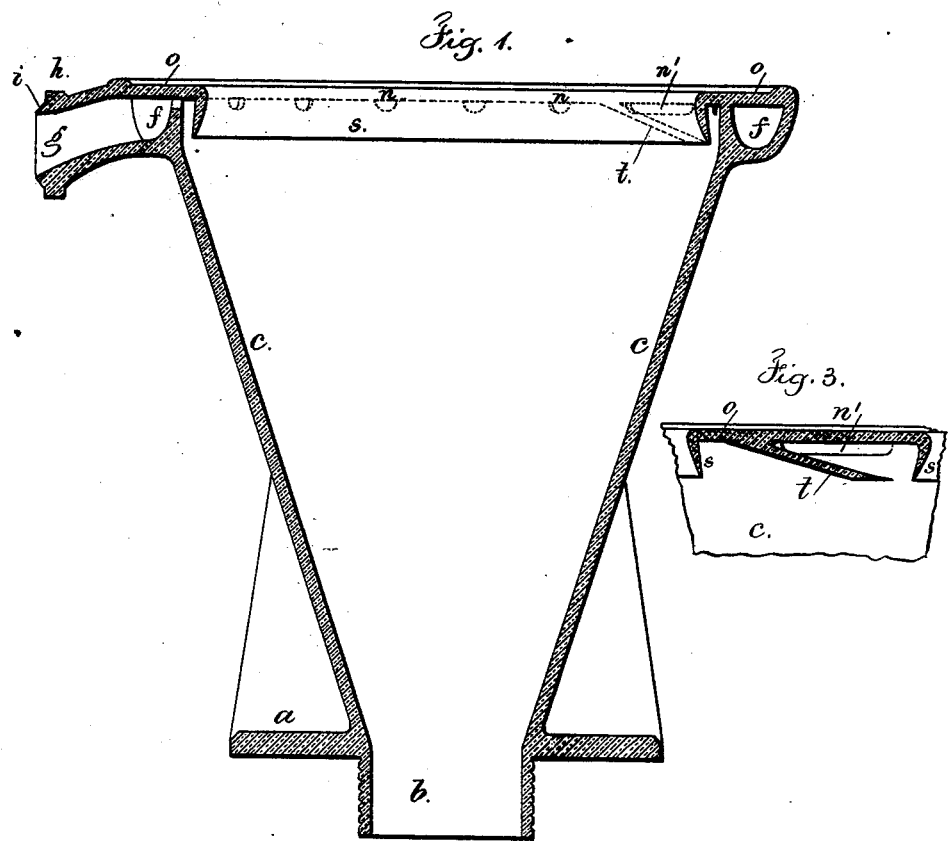
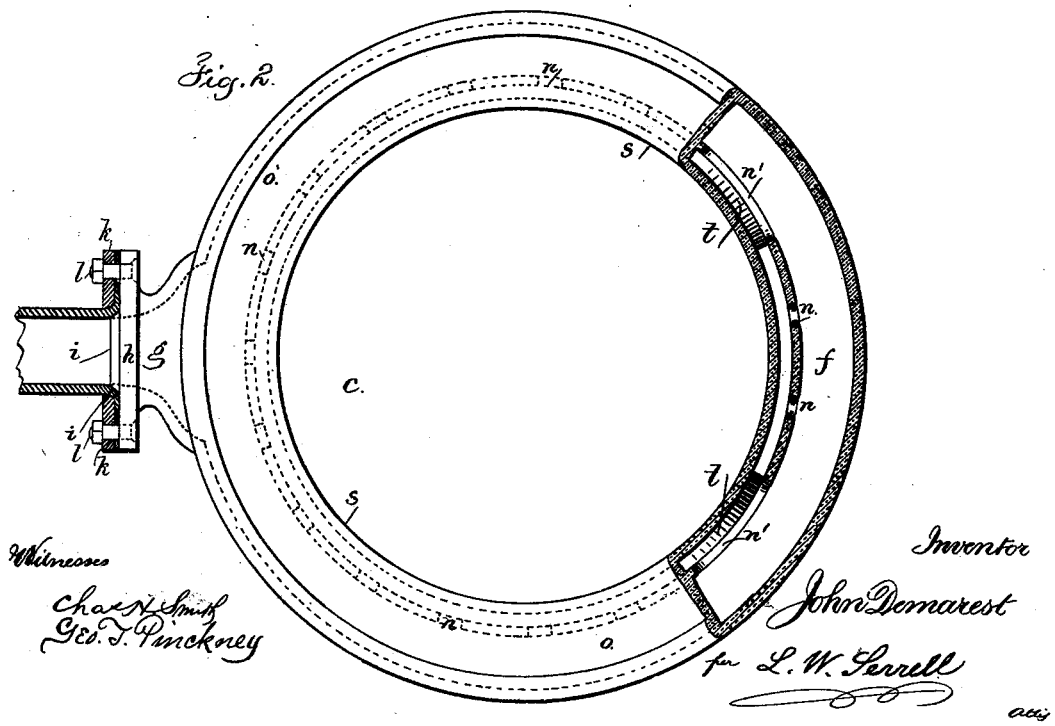

UNITED STATES PATENT OFFICE.

JOHN DEMAREST, OF NEW YORK, N. Y.

WATER-CLOSET BASIN.

SPECIFICATION forming part of Letters Patent No. 235,134, dated December 7, 1880.

Application filed October 4, 1880. (No model.)

*To all whom it may concern:*

Be it known that I, JOHN DEMAREST, of the city and State of New York, have invented an Improvement in Water-Closet Basins, of which the following is a specification.

This invention is especially available in basins for water-closets that are made of porcelain, although not limited in that respect.

In the water-closet basins heretofore constructed there is great difficulty in obtaining a uniform flow of water, so as to wash out the interior thoroughly. With porcelain basins the openings are liable to become closed, or partially so, in consequence of the change of shape in baking or glazing, and sometimes the clay is sufficiently soft to bend after molding, and in so doing close the narrow water-way or change its shape.

My invention relates to the peculiar water-way around the upper part of the basin, the same being in the form of a trough that is covered by an annular top plate, with a pendent flange around the inner portion, so that said flange is inside the basin and near the inner wall of the annular trough, and the water that issues through holes or slits in the upper and inner portion of the trough strikes against the annular flange and is deflected back again upon the inner surface of the basin to wash the same thoroughly and uniformly.

In the drawings, Figure 1 is a vertical section of the improved hopper. Fig. 2 is a plan partially in section, and Fig. 3 represents the deflectors and the openings for the issuing water.

The lower part of the hopper or basin is formed with an opening leading to the sewer, and the basin itself may be a conical hopper, $c$, with a flange, $a$, around the discharge-pipe $b$, or the basin may be adapted to a pan or a valve closet, and said basin may be of any desired shape.

Around the upper end of the basin $c$ there is an annular trough, $f$, that is connected with the inlet-pipe $g$, through which water is supplied. Said inlet-pipe $g$ has at its outer end a flange, $h$, and a conical seat, $i$, around the end of the pipe $g$, so that the lead water-pipe can be spread at its end to pass over the seat $i$ and be held thereto by a clamp-plate, $k$, and bolts $l$, there being putty or other cement between the end of the lead pipe and the seat $i$. This allows for the lead pipe being firmly but removably connected with the pipe $g$ on the basin.

The upper edge of the basin within the trough is notched or provided with openings or slits, as at $n$, and the annular plate $o$ covers up the trough, and the inner edge of this plate is formed as a pendent flange, $s$, which, by preference, is at an outward inclination, as shown, so that only a narrow annular opening is left between the outside edge of this flange and the inner surface of the basin for the water that issues through the openings $n$ to be deflected back with uniformity against the inner surface of the basin. If the basin is of porcelain it will be molded with the trough around its upper edge and the projecting pipe $g$ in one piece, and the annular plate $o$ and its flange $s$ will form the other piece. The latter is to be placed upon the former and the parts luted together, so as to become one in the baking. The annular plate $o$, being supported upon the upper edges of the basin, is not liable to separate or to change its shape in baking; hence the holes remain open and properly shaped.

In some kinds of basins it is preferable to direct two streams of water around the inner surface of the basin toward each other in order that the water may be deflected or thrown toward the center of the basin and fall directly into the soil-pipe. I effect this in my basin by the two deflectors $t\ t$, that are placed between the outer surface of the flange $s$ and the inner surface of the basin near the top, said deflectors being at an angle toward each other, and I prefer to provide enlarged openings at $n'$ adjacent to the said deflectors, so as to supply the proper amount of water to pass down into the basin and be deflected, as aforesaid.

I remark that, as the bottoms of the openings $n\ n'$ in the inner wall of the water-way are at the same level and at some distance above the bottom of the annular trough, the water will fill the bottom of the trough before issuing through the said holes and will rise and discharge uniformly, or nearly so, through all the holes.

I am aware that soft-metal pipes have been spread at the end to pass over a conical seat and secured by a clamping-nut. In my improvement there is not any nut, and the porcelain basin is provided with ears for bolts that pass through the clamping-plate. By this improvement the end of the supply-pipe is held directly against porcelain basin.

I claim as my invention—

1. The water-closet basin having a water-way around the upper part and openings in the inner wall at or near the top, in combination with the annular hanging flange within the top of the basin, substantially as set forth.

2. The combination, in a water-closet basin, of an annular water-way around the top of the basin, having holes near the top part of the inner wall, a hanging flange, and deflectors between the flange and the basin, substantially as set forth.

3. In a water-closet basin having an annular water-way, the pipe $g$, flange $h$, and conical seat $i$, projecting at one side of the water-way, in combination with the clamping-plate $k$, bolts $l$, and soft-metal supply-pipe, the end of which is passed over the seat $i$, as set forth.

Signed by me this 30th day of September A. D. 1880.

JOHN DEMAREST.

Witnesses:
WILLIAM G. MOTT,
GEO. T. PINCKNEY.